(12) United States Patent
Guigne et al.

(10) Patent No.: US 6,325,020 B1
(45) Date of Patent: Dec. 4, 2001

(54) FISH SIZING SONAR SYSTEM

(75) Inventors: Jacques Y. Guigne, Paradise; Thomas J. McKeever, St. Phillips, both of (CA)

(73) Assignee: Guigne International, Ltd., Paradise (CA)

( * ) Notice: Subject to any disclaimer, the term of this patent is extended or adjusted under 35 U.S.C. 154(b) by 0 days.

(21) Appl. No.: 09/428,404

(22) Filed: Oct. 28, 1999

(51) Int. Cl.$^7$ .................................................. A01K 61/00
(52) U.S. Cl. .............................. 119/215; 119/223; 43/17.1
(58) Field of Search ...................................... 119/200, 215, 119/223; 367/139, 140, 141; 43/17.1

(56) References Cited

U.S. PATENT DOCUMENTS

| | | | |
|---|---|---|---|
| 3,123,798 | * | 3/1964 | Holloway et al. ............... 43/17.1 X |
| 3,174,127 | * | 3/1965 | Haslett .............................. 43/17.1 X |
| 4,932,007 | * | 6/1990 | Suomala ............................ 43/17.1 X |

* cited by examiner

Primary Examiner—Robert P. Swiatek
(74) Attorney, Agent, or Firm—Leon D. Rosen

(57) ABSTRACT

Apparatus for producing an objective assessment of the size of fish in an aquaculture setting. The apparatus includes a sonic transducer (30) with a transmitter that is driven to generate time-spaced pulses that move along a sonic beam path (32) of small spread angle, and a sonic detector that detects echos of the transmitted pulses which result whenever a fish enters the sonic beam. An analyzing circuit analysis the echos to provide an estimate of the size of the fish that produced the echoes. The analyzing circuit detects the time between the leading and trailing edges of an echo, which indicates the thickness of the fish. A measurement of the peak amplitude of the echo and of the integral of echo energy also indicates the size of the fish.

5 Claims, 4 Drawing Sheets

TRANSMITTED PULSE

FISH SIZING SONAR SYSTEM

BACKGROUND OF THE INVENTION

Fin fish are commonly raised in an aquaculture setting, which may include a cage floating in a river or open ocean, or a water-filled tank. There is a need for the fish farmer to estimate the size of the fish being raised, to help determine whether they are growing properly, are ready for harvest, etc. It is usually desirable to provide an objective determination of fish size, to avoid variations caused by different persons making the estimate or a person being influenced by extraneous factors. A simple system that objectively indicates the size of fish within a limited environment such as within a cage, would be of value.

SUMMARY OF THE INVENTION

In accordance with one embodiment of the present invention, a fish sizing apparatus is provided for use with fish in a water-filled region, which provides an objective assessment of fish size in a noninvasive manner. The apparatus includes a sonic transducer apparatus which generates sonic pulses in the water along a narrow beam path, and which detects echos from fish that swim into the beam. An analyzing circuit coupled to the transducer output, detects the duration of each echo representing a transmitted sonic pulse, and generates a signal indicating the size of a fish dependent upon the duration of the echo. That is, there are echo portions from the front and rear of the fish and from regions in between, with the echo lasting longer for a thick fish than a thin one. The size of the fish can also be indicated by the peak amplitude of the echo, since a larger fish will produce reflections from its body that will be larger due to the larger area where reflections occur. The integral of echo amplitude (adjusted for distance) also indicates size.

Computer software is provided that analyzes an echo, to determine the leading and trailing edges of the echo. The leading edge of the echo produces a sudden increase in amplitude over noise, while the trailing edge of the echo produces a sudden decrease. Ringing following the trailing edge, and representing ringing of the transmitted pulse, can be identified to more accurately indicate the exit point of the echo. This enables a more accurate determination of the thickness of the fish, and therefore its size.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
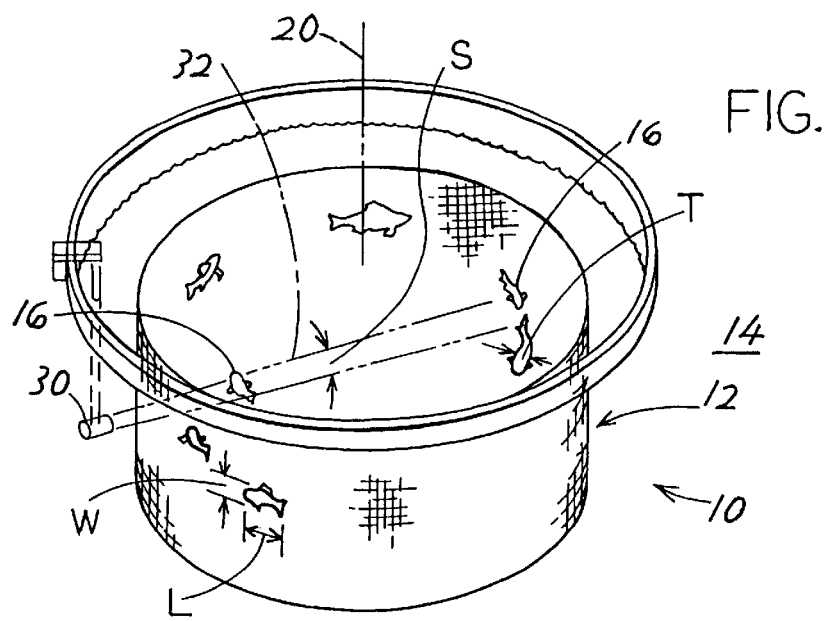
FIG. 1 is an isometric view of a fish raising system, and showing the fish sizing apparatus of the invention.

FIG. 1 illustrates a portion of an aquaculture operation 10 which includes a fish pen or cage in the form of a cylindrical screen or netting 12 that confines fish to a volume within the screen. The cage lies in a body of water 14 such as a river, lake, or ocean. The fish 16 generally swim within the cage, with the most common swimming pattern being in a circle around the axis 20 of the cylindrical netting. Persons in charge of raising the fish wish to obtain an objective measurement of the size of the fish. The fish has a width W, thickness T, and length L, that are almost always in a given proportion for fish of a particular species, and has a weight or mass proportional to its dimensions. The fish farmer wishes to know the size of the fish for several reasons, including when to harvest the fish, the amount of nutrients to feed them, and to determine whether they are growing properly.

Applicant provides a sonic transducer apparatus 30 which generates sonic pulses that travel along a narrow sonic beam path 32 having a small spread angle S, which is usually about two degrees and almost always below four degrees. The transducer 30 is shown lying outside the netting 14. Sonic pulses from the transducer apparatus pass through the areas that the fish swim in. When a fish enters the beam 32, sonic energy is reflected by the fish, and the transducer apparatus detects such echoes. Applicant analyzes the echoes, to provide an indication of the size of the fish that is detected.

Figure 2:
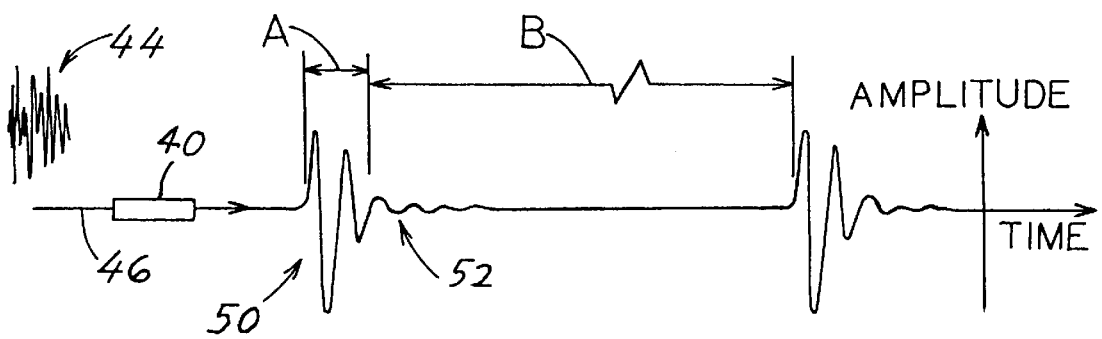
FIG. 2 shows the amplitude versus time characteristics of a sonic pulse in water, and also shows an electrical signal delivered to the transducer to produce the sonic pulse.
Figure 9:
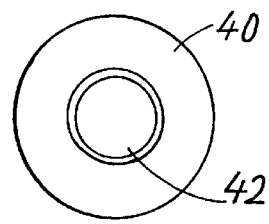
FIG. 9 is a front elevation view of the transducer of FIG. 1.

The transducer apparatus 30 can include a single crystal that converts electricity to sonic energy and that converts sonic energy to an electrical signal. However, this requires a fast TR (transmit receive) switch, and it is found that presently available crystals have a low sensitivity in detecting echoes. Instead, applicant prefers to use a separate transmitter and receiver, which are preferably coaxial, as shown in FIG. 9, with a transmitter shown at 40 and a receiver at 42. As shown in FIG. 2, to energize the transmitter transducer, applicant applies electrical energy such as shown at 44 on an input 46 to the transducer 40. The energy 44 consists of a carrier wave having a frequency that is preferably more than one MHz, and which is modulated by lower frequency pulses having a primary frequency such as 350 kHz. The frequency is preferably between about 100 kHz and 600 kHz. Below 100 kHz, the length of the transmitted pulse increases, and resolution decreases. Above 600 kHz, the attenuation increases to a level that there is not clear detection of fish echoes.

When the high frequency carrier wave modulated by lower frequency pulses produces a sonic wave in water, the higher frequencies above about 1 MHz are dissipated and a sonic pulse indicated at 50 is transmitted through the water. In FIG. 2, the sonic pulse is a Ricker wavelet, which has a length of about two wavelengths, and a duration A of about 5 microseconds. However, there is significant ringing (of an amplitude less than 33% of peak pulse amplitude) after the pulse. The distance that the pulse subtends in water of a temperature of about 15° C., where the sonic velocity is about 1500 meters per second, is about 7.5 mm. Pulses are produced at intervals B that are preferably at least one millisecond, and that are on the order of 0.1 second, to provide time for receipt of echoes before a next sonic pulse is transmitted. In applicant's system, pulses are transmitted every 50 milliseconds.

Figure 7:
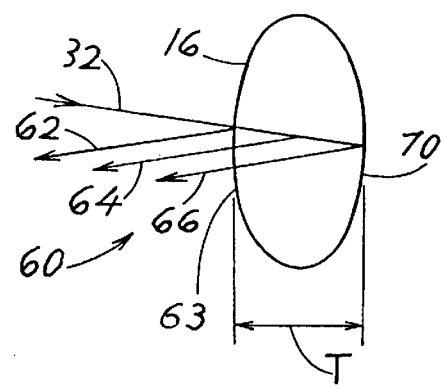
FIG. 7 is a simplified cross section of a fish, indicating how the pulse is reflected from different portions of the fish to produce an echo.

In one example, the fish 16 of FIG. 7 has a thickness T that varies between about 1 cm and 10 cm, and the purpose of the fish sizing apparatus is to determine the size of the fish such as its thickness T. When a pulse moving along the beam 32 encounters the fish 16, the pulse produces a complex echo 60. The first part 62 of the echo is a reflection from the proximal side 63 of the fish, which is the side closest to the transducer apparatus. Additional reflections indicated at 64 occur as sound reaches bones and other material of different densities. A final echo 66 is from the distal side 70 of the fish. Echoes are generated when the sound passes between materials of different densities. The greatest difference in densities lie at the proximal side 63 and distal side 70, where there is a difference in density between the fish and surrounding water, over the entire area of the fish facing the transducers. It would be ideal if the pulse were extremely short so that reflections from the different parts of the fish could be readily discerned, but the transmitted pulse has a significant length and ringing at the end, resulting in it not being especially clear as to where reflections in the received echo have occurred. It is preferred that the transmitted pulse have a length of not more than two wavelengths (where the voltage is at least 33% of maximum). In FIG. 2, the transmitted pulse has a duration A of 5.6 microseconds, resulting in a pulse length of 7.5 mm in water.

Figure 3:
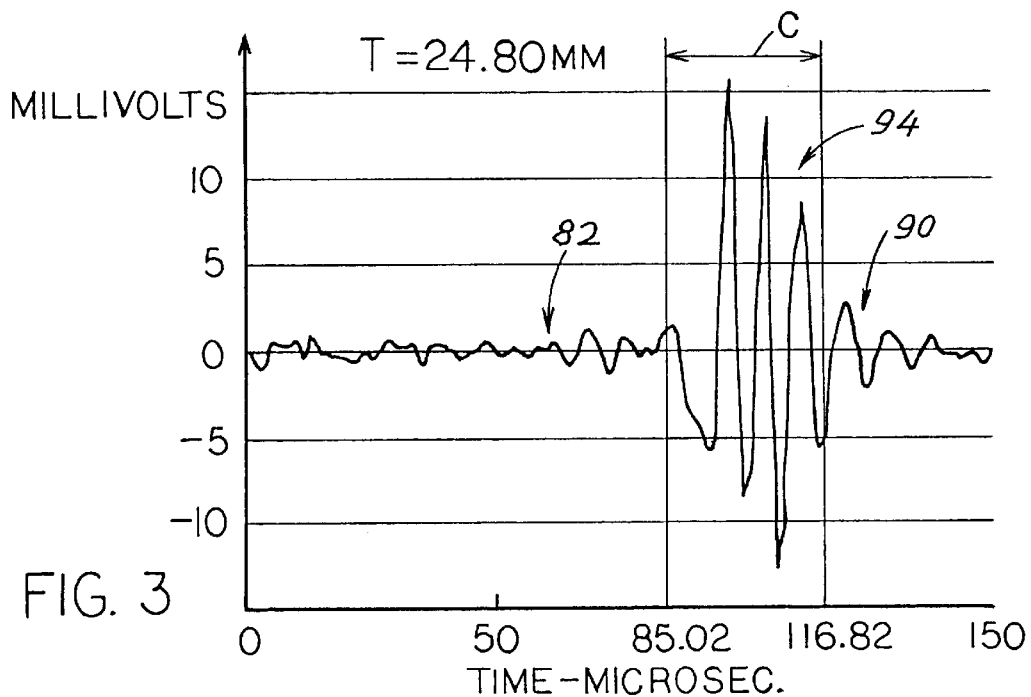
FIG. 3 is a graph showing the amplitude versus time characteristics of a sonic pulse echo from a thin fish, as actually measured.
Figure 4:
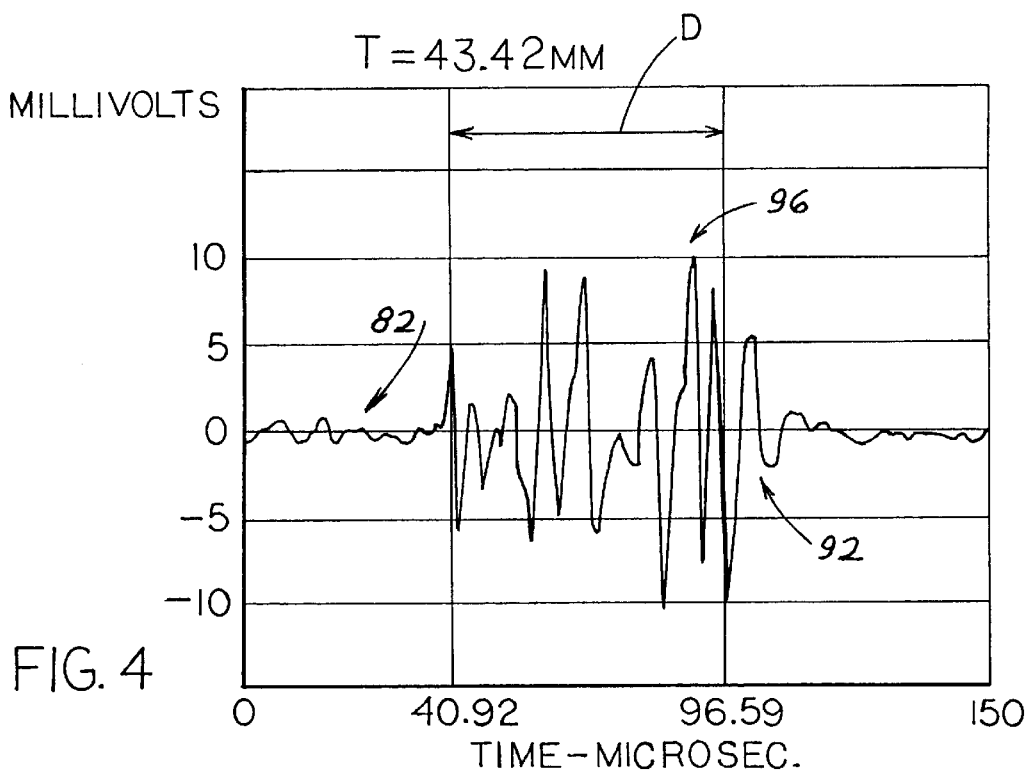
FIG. 4 is a graph showing the amplitude versus time characteristics of a thick fish as actually measured.

FIG. 3 shows an example of an echo from a relatively thin fish having a thickness T of 24.8 mm. In FIG. 3, the echo from the thin fish (24.8 mm) has a duration C of 31.82 microseconds, resulting in an echo length in water of 49.6 mm. Since the reflection from the distal side of the fish has passed twice through the fish, the thickness of the fish is half the echo length, or 24.8 mm. In FIG. 4, the pulse length D is 5.57 microseconds, which translates (assuming a sound velocity in the fish of 1560 m/sec.) to an echo length in water of 86.8 mm and a fish thickness of 43.4 mm. Thus, by determining the length of the echo from a fish, applicant is able to provide an indication of the thickness of the fish.

Figure 5:
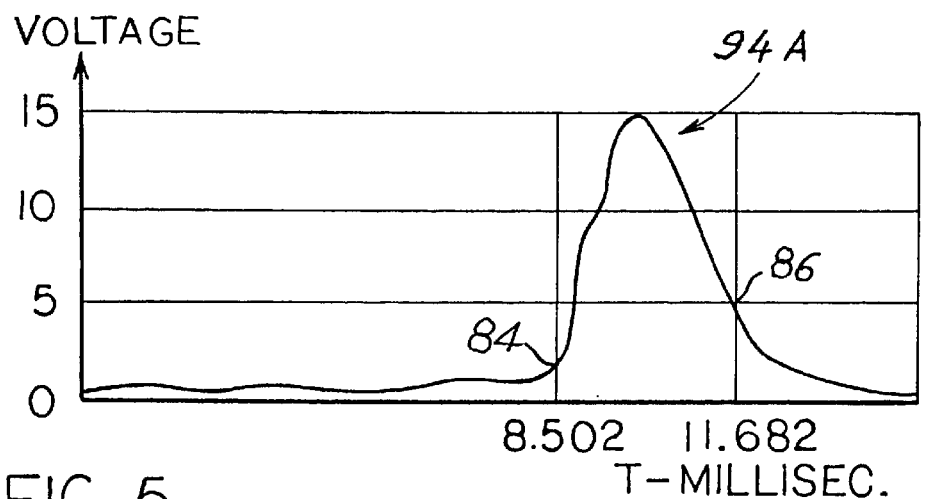
FIG. 5 is a graph showing the amplitude versus time characteristics of the echo of FIG. 3 after the signal is averaged.
Figure 6:
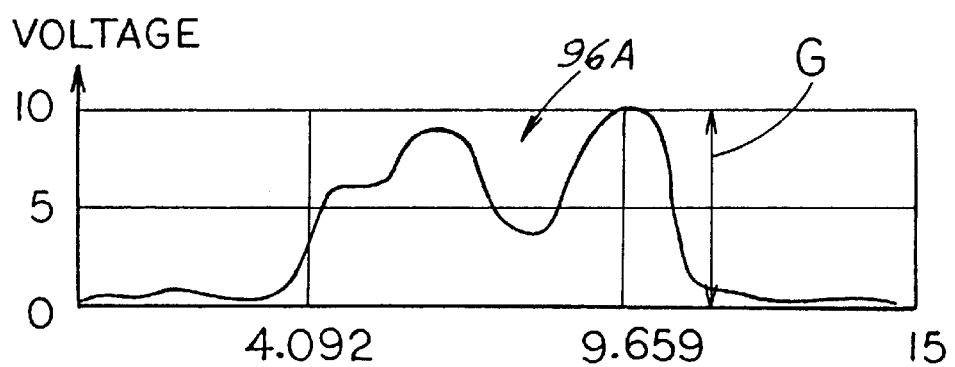
FIG. 6 is a graph of the echo of FIG. 4 after it has been averaged.

In FIGS. 3 and 4, it can be seen that there is noise at 82. The circuitry which analyzes the signal from the detecting transducer, should detect the beginning and end of the pulse of length C or D. It is noted that the amplitude of the leading edge of the pulse is usually much greater than noise, which enables relatively easy detection of the proximal side of the fish. FIG. 5 is a view of the signal represented in FIG. 3, after passage through a low frequency filter and rectification. The increased amplitude near the leading and trailing edges at 84 and 86 can be seen. Similarly, FIG. 6 represents the filtered and rectified echo of FIG. 4.

In FIGS. 3 and 4, it can be seen that there is an appreciable amplitude of ringing at 90 and 92 which follow the echos 94,96 that represent the fish thickness. The ringing at 90 and 92 represent reflections of the ringing (52 in FIG. 2) of the transmitted pulse. Applicant uses a computer program that receives signals representing the pulses transmitted in water and the echos received from fish. Ringing or other characteristics of the transmitted pulses are noted in the echo and are used to more precisely determine the beginning and end of each echo that represents fish thickness.

The program makes a first attempt to determine the approximate positions of the beginning and end of an echo by the increase and decrease in detected amplitude. Then, after the echo and adjacent signals that are before and after the echo are recorded, the computer software performs a refined analysis. It searches for echo characteristics, especially those mimicking the beginning and end of the transmitted pulse, that more precisely indicate the beginning and end of an echo that represents fish thickness. In FIG. 2, the ringing 52 is a rapidly decreasing sound wave with perhaps the first two waves having an amplitude between about 10% and 20% of the peak pulse amplitude. Similar ringing is looked for to identify the ringing echos at 90 and 92 in FIGS. 3 and 4. Although such detection can be accomplished by circuits, they are more easily accomplished with computer software.

Figure 8:
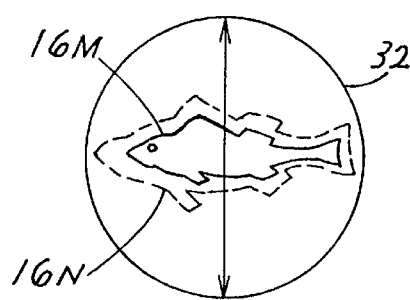
FIG. 8 is a view of fish as seen along the sonic beam of FIG. 1.

FIG. 8 shows a small fish 16 M and indicates a larger fish 16 N each lying in the sonic beam 32. Because of the larger area of the larger fish 16 N, the amplitude, indicated at G in FIG. 6, adjusted for distance, of the echo from the larger fish is larger than the echo from the smaller fish. It is possible to use the amplitude of the echo, as an indication of the area of the fish facing the transducers. For a given species, there is a known relationship between the area of the fish and its thickness, length, and mass. Thus, it is possible to also measure the amplitude of the echo, instead of its length, to determine the size of the fish. However, it should be noted that the relationship between fish area and echo amplitude adjusted for distance, is not highly consistent.

Since the apparatus produces on the order of magnitude of 20 pulses per second, there will usually be many pulses from a fish entering the beam. The first pulses will be of low amplitude, indicating that only a portion of the fish lies in the beam. The amplitude will keep increasing for successive pulses, until a maximum portion of the fish lies in the beam. As the fish swims out of the beam, the amplitude of the echo will repeatedly decrease. If the fish is swimming close to the top or bottom of the beam 32 shown in FIG. 6, so perhaps only ¾ths of the height of the fish passes through the beam, then the amplitude of the echoes will be lower than the case where the entire fish swam through the beam. However, the thickness, indicated by the duration of the echo, will still indicate all or most of the thickness of the fish. An average of those echos indicating maximum fish thickness provide a good indication of fish thickness. If less than about ¾ths of the fish width passes through the beam, then any measurements are not recorded. This can be determined by the unusual ratio of echo amplitude (adjusted for distance) to fish thickness, or other means.

The use of pulse duration or amplitude to indicate fish size, can be distorted if the fish is not swimming perpendicular to the beam, but is swimming largely into or out of the beam. Applicant prefers to not make a recording of the fish size if the direction of the fish is more than about 10° from a direction perpendicular to the direction of the beam. If the fish is swimming away from the transducer, then the center of the fish will lie progressively further from the transducer, and this can be detected by the repeated decrease in the echo amplitude while the fish is in the beam. Other ways can be used to determine the direction of fish swimming, including a separate detector that detects the direction of fish motion of a fish lying in the beam. It is noted that in using the amplitude of a fish to indicate its size, applicant must take account of the fact that the amplitude of the echo varies with the distance of the fish from the transducer apparatus. The distance can be determined by the time required before the leading edge of the echo is received.

Figure 10:
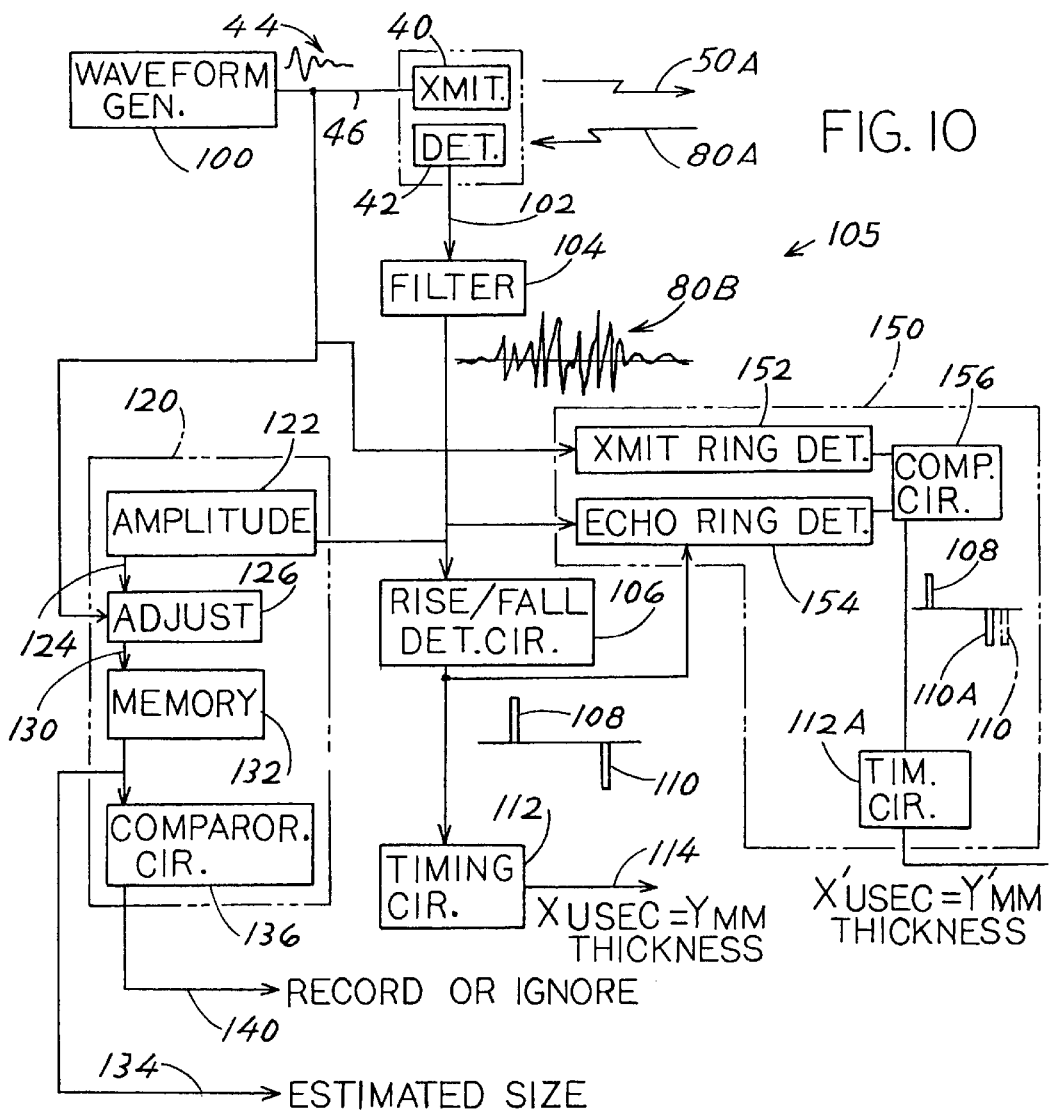
FIG. 10 is a simplified block diagram view of circuitry for transmitting and detecting sonic pulses, and for analyzing the detected sonic pulses.

FIG. 10 is a simplified view of analyzing circuitry 105 that can be used to analyze the echo. FIG. 10 shows a waveform generator or driver 100 which generates the electrical pulses 44 that result in the transmit transducer 40 generating a sonic pulse, indicated at 50A. If a fish lies in the beam, this results in a sonic echo, indicated at 80A, which is detected by the receiving transducer 42. The receiving transducer produces an electrical signal on its output 102. The signal is passed through a filter 104 that passes only frequencies close to the pulse frequency. For a pulse frequency of about 350 kHz, the filter 104 may have a passband of perhaps of 250 kHz to 450 kHz. The resulting echo indicated at 80B is delivered to a rise/fall detector circuit 106. The circuit 106 detects a sudden rise or fall in the electrical output from the filter 104, and where the rise or fall is of at least a predetermined amplitude. A rise of a certain rate and magnitude, indicating the leading edge of an echo, results in a positive pulse at 108. A rapid fall in amplitude from at least a predetermined level that would be expected in an echo, results in the circuit 106 generating a negative pulse at 110. A timing circuit 112 generates an output on line 114, which indicates the time between the rise 108 and fall 110 of an echo. The duration X of an echo times sound velocity in the fish is approximately equal to the thickness of the fish.

FIG. 10 shows another subcircuit 120, which includes an amplitude detector circuit 122 that generates signals on its output 124 representing the amplitude of the leading edge of a sonic echo. An adjust circuit 126 detects the time delay between the generation of the pulse 44 or 50A and detection of the leading edge of the echo pulse 80A, and generates an output on line 130 representing the adjusted amplitude (due to distance of the fish). This is delivered to a memory 132, which generates an output on line 134 representing the estimated size of the fish based on the amplitude of the echo (adjusted for distance). A comparator circuit 136, can be used to compare the adjusted amplitude of a string of perhaps of 10 echoes representing a single fish in the beam, and generate an output on line 140 which represents the estimated size of the fish based on the maximum adjusted amplitudes representing the fish lying completely within the beam. The output on 140 also can be a signal that suggests ignoring the indicated size, if a small number of echoes indicate that the fish did not swim completely into the beam.

FIG. 10 shows a further subcircuit 150 which adjusts the time for the end of the echo, to account for ringing (e.g. 52 in FIG. 2) at the end of the transmitted pulse that reaches the fish. A transmit ringing detector 152 detects the ringing at the end of the transmitted pulse. An echo ring detector 154 detects ringing near the end of the echo (slightly before or after negative pulse 110 is generated by circuit 106). A comparing circuit 156 compares the two ringing signals and adjust the time of the negative pulse produced by timing circuit 112A according to the detected ringing in the echo. The negative pulse is shown shifted from 110 to 110A, to slightly shorten the calculated thickness of the fish.

In actuality, applicant prefers to use a computer to provide all of the analysis of the circuits. The software performs essentially the same functions as described above for the circuitry of FIG. 10, plus other functions described earlier. It should be noted that the sound velocity varies within a fish, being low (e.g. 500 m/sec) for the air-filled fish bladder and high (e.g. 4500 m/sec) in a bone. In practice the average sound velocity in the fish is very close to the sound velocity in water. The changes in density at an air bladder and bone, however, result in reflections.

Thus, the invention provides apparatus for indicating the size of fish in a contained environment. The apparatus includes a transducer apparatus for transmitting sonic pulses and for detecting echoes of the sonic pulses resulting from reflection from fish in the sonic beam produced by the apparatus. The echoes are analyzed as by the duration of the echo, to indicate the thickness of the fish. The beginning and end of the echo can be more precisely determined by comparing these areas to characteristics of the transmitted sonic pulse at its beginning and end. The echo also indicates the area of the fish, seen along the beam axis, from which the sonic pulse was reflected, by the amplitude of the echo, such as from the air bladder at the middle of the fish.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A method for sizing fish in a water-filled region, comprising:

transmitting a pulse of sonic energy along a narrow beam path in said water-filled region;

detecting an echo of said pulse, including determining the duration of a portion of said echo, which represents the thickness of said fish along the beam path, and generating a signal representing the size of a fish with said signal indicating a larger size fish when said echo portion is of a longer duration with said signal indicating a smaller size fish than said larger fish size when said echo portion is of a shorter duration than said longer duration.

2. Fish sizing apparatus for determining the size of fish in a body of water, comprising:

a cage that lies in a body of water and that extends in a closed loop as seen in a plan view, to form an inside volume within said cage for holding fish, and to form an outside volume outside said cage;

a transducer apparatus which includes a sonic transmitter and a waveform generator connected to said sonic transmitter that causes said sonic transmitter to generate a narrow beam of sonic energy, said transducer apparatus including a sonic receiver that is positioned to detect echoes from fish, of sonic energy generated by said sonic transducer, and for generating an electrical output of generally the same time-amplitude variation as that of the detected sonic energy;

both of said transducers being immersed in said water, in said outside volume and oriented so said narrow beam is directed into said inside volume;

said waveform generator being constructed to generate a train of spaced pulses;

an analyzing circuit coupled to said electrical output of said sonic receiver, for analyzing said electrical output and for generating a signal representing a size of a fish when a fish lies in said narrow beam.

3. A method for sizing fish in a water-filled region, comprising:

transmitting a pulse of sonic energy along a narrow beam path in said water-filled region, including coupling a transducer to said water-filled region at a transducer location in said water-filled region;

detecting an echo of said pulse, including determining the duration of said echo and generating a signal representing the size of a fish, said signal indicating a larger size fish when said echo is of a longer duration and said signal indicating a smaller size fish than said larger fish size when said echo is of a shorter duration than said longer duration;

indicating the direction of movement of a first fish which lies in said narrow beam path, and generating said signal only if the direction of movement of said first fish is within a predetermined angle of a direction that is perpendicular to said beam path.

4. A method for sizing fish in a water-filled region, comprising:

transmitting a pulse of sonic energy along a narrow beam path in said water-filled region;

detecting an echo of said pulse, including determining the duration of said echo and generating a signal representing the size of a fish, said signal indicating a larger size fish when said echo is of a longer duration with said signal indicating a smaller size fish than said larger fish size when said echo is of a shorter duration than said longer duration;

repeatedly performing said steps of transmitting a pulse, detecting an echo, and generating a signal representing the echo;

storing the value representing the size of a fish by each signal generated during said steps of detecting an echo, sensing when the amplitude of the detected echo decreases below a predetermined level to indicate that a fish has left the beam, and then producing and storing a final fish size estimate signal representing the final fish size estimate based on the values represented by said signals;

detecting when the amplitude of the detected echo increases above a predetermined minimum amplitude and again performing said steps of repeatedly transmitting, detecting, and storing a final fish size estimate;

generating an averaged signal representing the average of said final fish size estimates.

5. A method for sizing fish in a water-filled region, comprising:

transmitting a pulse of sonic energy along a narrow beam path in said water-filled region;

detecting an echo of said pulse, including determining the duration of said echo and generating a signal representing the size of a fish, said signal indicating a larger size fish when said echo is of a longer duration and said signal indicating a smaller size fish than said larger fish size when said echo is of a shorter duration than said longer duration; and detecting ringing at an end of said transmitted pulse of sonic energy, detecting ringing at a corresponding end of said echo of said pulse, and adjusting the determined duration of said echo to account for said ringing at the end of said echo.

* * * * *